May 28, 1940.　　　W. F. GROENE　　　2,202,287
RELIEVING ATTACHMENT FOR LATHES
Filed March 30, 1939　　　4 Sheets-Sheet 1
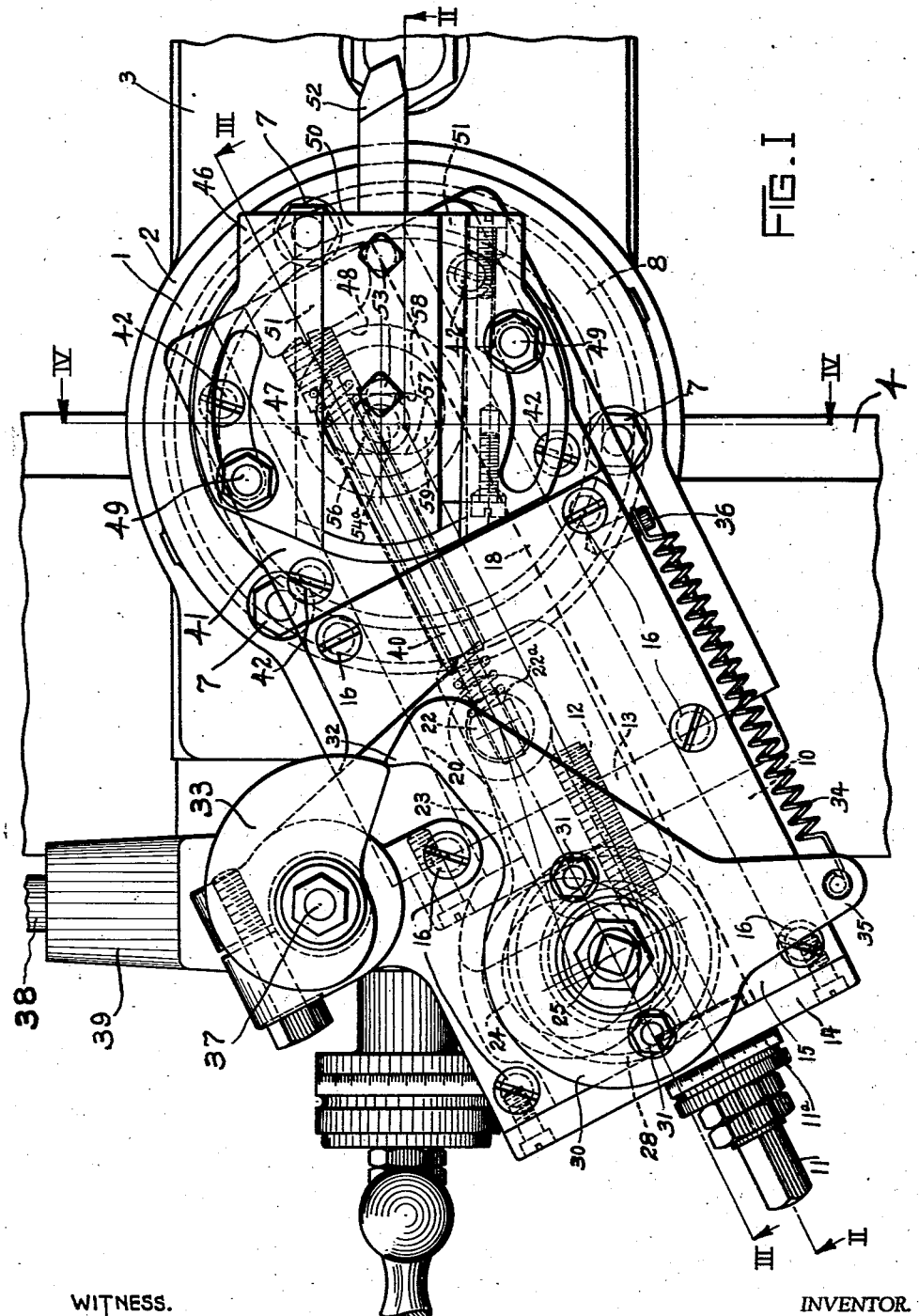
FIG. I
WITNESS.
Orlando S. Knox.
INVENTOR.
WILLIAM F. GROENE
BY Willard S. Groene
ATTORNEY.

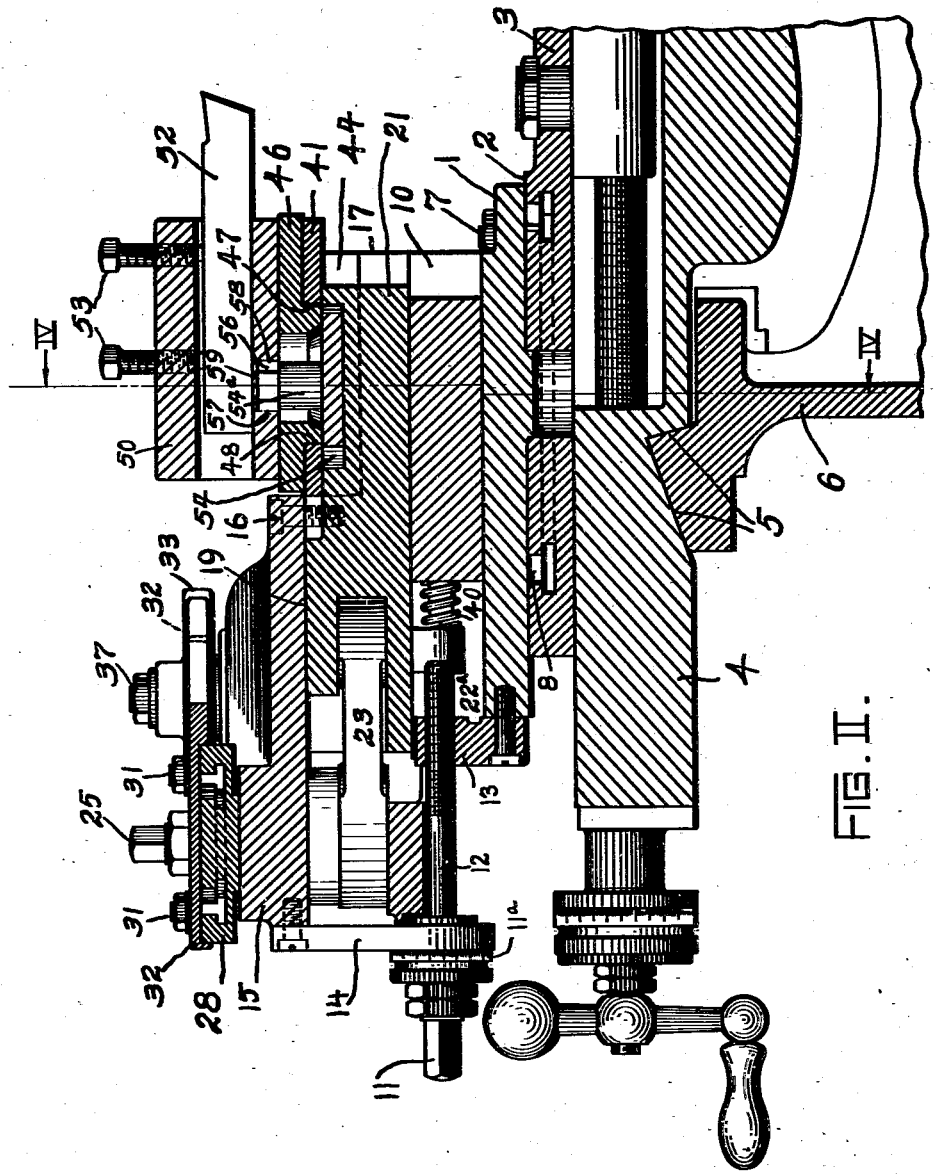

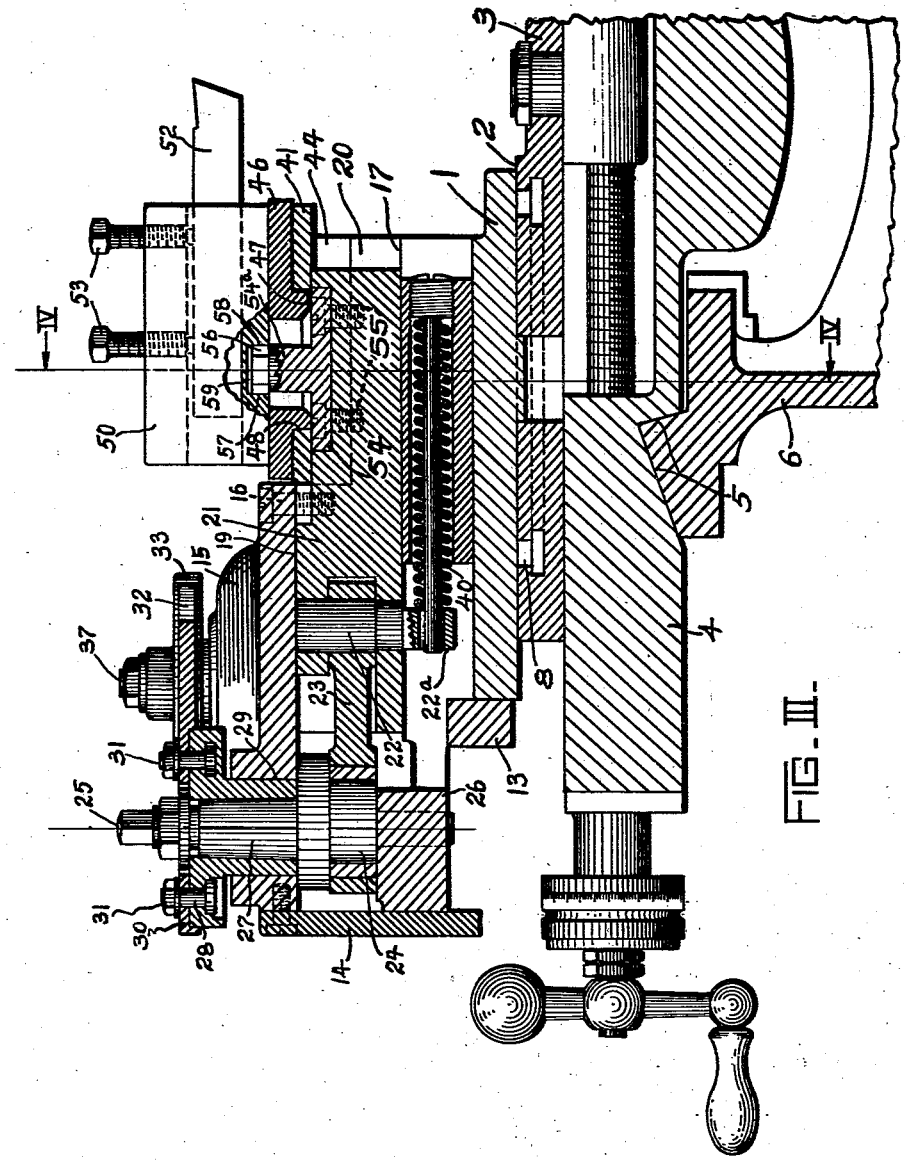

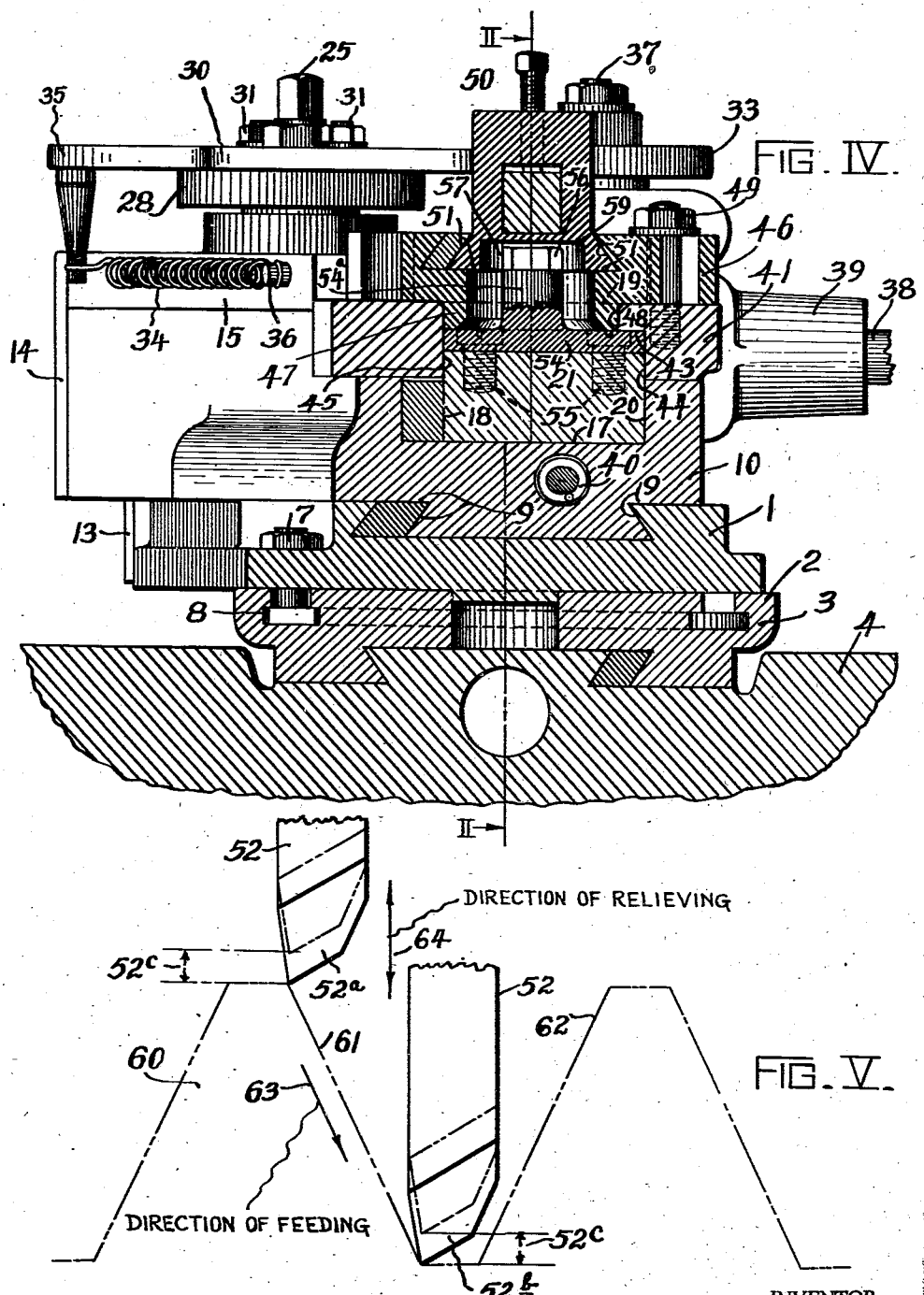

Patented May 28, 1940

2,202,287

UNITED STATES PATENT OFFICE 2,202,287

RELIEVING ATTACHMENT FOR LATHES

William F. Groene, Cincinnati, Ohio, assignor to The R. K. Le Blond Machine Tool Company, Cincinnati, Ohio, a corporation of Delaware Application March 30, 1939, Serial No. 265,002

5 Claims. (Cl. 82—19)

This invention pertains to relieving attachment for lathes and related machine tools. In attachments of this character heretofore used, the direction of feeding the tool to the work has always been effected in the same plane in which the reciprocation of the tool takes place to produce the relief on the cutter, tap, etc., to be relieved. Because of this construction it has always been necessary in the past to use form tools or cutters which were preshaped to the exact contour to be produced on the work piece. These cutters were fed perpendicular to the work surface to be relieved in a plunge cutting operation and parallel with the reciprocating relieving attachment. As a result great strain is produced in the work piece and the necessarily very slow feed results in slow production and inaccuracies in the work piece. Particularly is this former method of plunge cutting when relieving unsatisfactory where relatively large portions of the work pieces are to be relieved as for example when relieving large, coarse thread taps and the like.

With these former difficulties clearly in mind I conceived the notion that if an arrangement could be provided in a relieving attachment wherein the direction of relieving and direction of feeding of the cutting tool could be effected in an infinite variety of different directions it would be unnecessary to utilize form cutters and plunge cutting feeding movements. Any single point cutting tool could be used, thus greatly minimizing strains set up in the work piece during the turning and relieving operation resulting in a much greater accuracy and better finish on the completed work piece. And not only this, but by this arrangement it is now practical to relieve coarse pitch taps or the like of a size and limberness which it was not possible to do formerly.

Other features and advantages of this invention will appear in the detail description of the drawings in which:

Figure I is a plan view of a relieving attachment incorporating the features of this invention.

Figure II is a vertical section on the line II—II of Figure I.

Figure III is a vertical section on the line III—III of Figure I.

Figure IV is a vertical section on the line IV—IV of Figure I.

Figure V is a diagrammatic layout showing the relationship of the work and tool to clearly indicate the effecting of relieving movements and feeding movements in different directions.

The relieving attachment has a base 1 which is carried on a swivel mounting 2 of the cross slide 3 which in turn is mounted on a lathe carriage 4 carried on ways 5 of the lathe bed 6. Suitable T-slot bolts 7 operating in the annular T slot 8 serve to lock the base 1 in any adjusted position on the swivel mounting 2. Slidably mounted in suitable dovetail guideways 9 on the base 1 is the frame 10 which may be actuated in feeding movements on said guideways 9 by applying a suitable wrench to the squared end portion 11 of the relieving attachment feed screw 12 which operates in the nut 13 fixed to the base 1 and is journaled against axial movement in the plate 14 which is fixed to the cover plate 15, this plate in turn being secured tightly to the frame 10 by the screws 16.

Slidably mounted in the frame 10 in a guideway provided by the surfaces 17, 18, 19, and 20, is the reciprocating bar 21 having a wrist pin 22 fixed therein, a connecting rod 23 being pivotally mounted about said wrist pin and journaled at its other end on the eccentric portion 24 of the eccentric rock shaft 25. The rock shaft 25 is journaled at its lower end in a bearing 26 in the frame 10. Its upper end 27 is tapered and is fixed in the bushing 28 which in turn is journaled in the bearing 29 formed in the plate 15. On top of the bushing 28 is fixed the actuating dog 30 by suitable T-slot bolts 31. The actuating dog 30 has a contact point 32 which is held in contact with the periphery of the operating cam 33 by means of tension spring 34 connected to the arm 35 of the dog 30 and to the pin 36 fixed in the plate 15. The cam 33 is fixed on the shaft 37 journaled in the plate 15 and is driven by the shaft 38 from the lathe headstock transmission by the usual universal bevel gear transmission mechanism (not shown) contained in the swivel bracket 39 in a manner for example, as illustrated in Patent 1,596,827 dated August 17, 1926. A compression spring 40 carried in the frame 10 and bearing against the lower projecting end 22a of the wrist pin 22 serves to keep out back lash in the connecting rod bearings on the wrist pin 22 and eccentric 24 to effect smooth and uniform reciprocation in the bar 21. Thus with this arrangement the bar 21 may be reciprocated to effect relieving movement at any position at which the attachment may be set on the swivel mounting 2. The feed screw 12 does not partake of this reciprocating movement and is, therefore, readily operable during the reciprocation of the bar 21 and its indicating dial 11a consequently easily readable during operation of the device.

On the frame 10 is fixed the swivel base 41 by the screws 42 which has a slotted portion in its lower face formed by the surfaces 43, 44, and 45 to accommodate the reciprocating bar 21. On top of this swivel base 41 is mounted the swivel plate 46 which has a downwardly projecting integral boss 47 which is adapted to rotate in a bore 48 passing through the swivel base 41 into its slotted portion above described. This swivel plate 46 may be locked in any desired position on the swivel base 41 by suitable clamping bolts 49. In the swivel plate 46 is mounted the reciprocating tool holder 50 in appropriate dovetail guideways 51 which carries a cutting tool 52 held in place by the usual set screws 53.

A plate 54 fixed to the reciprocating bar 21 by the screws 55 has an upstanding integral boss 54a on top of which is carried a roller 56 which nicely fits between the faces 57 and 58 of the cam slot 59 formed in the bottom of the tool holder 50. It can thus be seen that by this arrangement the tool holder 50 may be reciprocated for any position at which the swivel plate 46 might be set so that the reciprocating relieving movement may be effected in the tool holder 50 in any direction relative to feeding of the tool to the work as effected by the actuating feeding screw 11.

Figure V shows a typical mode of operation of this invention as for example when used to relieve a large coarse thread tap 60 having a V-thread with sides 61 and 62. A single point cutting tool 52 is shown applied to machine the relief on the side 61. In order to do this the base 1 of the device is adjusted so that the direction of feeding movement of the frame 10 on the dovetail guideway 9 takes place parallel with the side 61 of the tap, the tool 52 feeding from 52a to 52b in the direction indicated by the arrow 63. The swivel plate 46 is adjusted and clamped on the swivel base 41 so that the reciprocating relieving motion 52c of the tool takes place substantially perpendicular to the axis of rotation of the work or in the direction indicated by the arrow 64 so as to develop a truly relieved surface on the side 61 though a single point tool is used. The tool 52 is thus fed in a direction angularly related to the direction of relieving motion effected in the cutting tool during the relieving operation.

Thus in this invention the following significant features have been developed in a relieving attachment:

(a) Feeding and reciprocating relieving movements which may be effected in different directions.

(b) Feeding and reciprocating relieving movements which may be effected in an infinite variety of angularly related directions.

(c) A single point cutting tool is all that is required to relieve any type of work surface to be cut.

(d) Greatly reduces strain to the work piece in any type of work to be relieved.

(e) Makes possible heretofore impractical machining of large coarse thread taps and the like.

(f) All rapidly reciprocating parts of extremely light though rigid construction providing efficient application of the relieving motion to the cutting tool without vibration in the apparatus.

(g) The feeding of the cutting tool relative to the work is effected at a point (squared end 11 of the feed screw 12) which does not have the bothersome and annoying reciprocating relieving movements as in former devices which makes it difficult to operate the feeding screw and to read its indicating dial during the machining operation.

Having thus fully set forth and described my invention, what I claim and desire to secure by United States Letters Patent is:

1. In a relieving attachment for lathe, a base mounted to swivel on the cross slide of said lathe, a frame slidably mounted on said base, means on said frame for feeding said frame relative to a work piece in said lathe, a tool holder mounted to swivel in a horizontal plane on said frame, a cutting tool in said tool holder, a reciprocating bar slidably mounted in said frame, and cam means interconnecting said bar and said tool whereby reciprocation of said bar effects reciprocation of said tool holder in any adjusted position of said tool holder on its swivel mounting.

2. In a relieving attachment for lathe, a base mounted to swivel on the cross slide of said lathe, a frame slidably mounted on said base, means on said frame for feeding said frame relative to a work piece in said lathe, a tool holder mounted to swivel in a horizontal plane on said frame, a cutting tool in said tool holder, a reciprocating bar slidably mounted in said frame, cam means interconnecting said bar and said tool whereby reciprocation of said bar effects reciprocation of said tool holder, and eccentric and connecting rod mechanism actuated by the transmission mechanism of said lathe for actuating said reciprocating bar.

3. In a relieving attachment for lathe, a base mounted to swivel on the cross slide of said lathe, a frame slidably mounted on said base, means on said frame for feeding said frame relative to a work piece in said lathe, a tool holder mounted to swivel in a horizontal plane on said frame, a cutting tool in said tool holder, a reciprocating bar slidably mounted in said frame, cam means interconnecting said bar and said tool whereby reciprocation of said bar effects reciprocation of said tool holder, eccentric and connecting rod mechanism in said frame connected to said reciprocating bar, and cam and dog mechanism actuated by the transmission mechanism of said lathe for operating said eccentric and connecting rod mechanism to effect reciprocation of said bar.

4. In a relieving attachment for lathe, a base mounted to swivel on the cross slide of said lathe, a frame slidably mounted on said base, a screw journaled against axial movement in said frame and operating in a nut affixed to said base for effecting feeding of said frame relative to a work piece in said lathe, a tool holder mounted on a swivel plate carried on said frame, means permitting reciprocating movement of said tool holder on said plate, a tool in said tool holder, a reciprocating bar mounted in said frame, a cam roller carried on said bar and operating in a cam slot in said tool holder whereby reciprocating movement in said bar effects reciprocating movement in said tool holder for any adjusted position of said swivel plate on said frame, and means for effecting reciprocation of said bar from the lathe transmission mechanism.

5. In a relieving attachment for lathe, a base mounted to swivel on the cross slide of said lathe, a frame slidably mounted on said base, a screw journaled against axial movement in said frame and operating in a nut affixed to said base for effecting feeding of said frame relative to a work piece in said lathe, at tool holder mounted on a swivel plate carried on said frame, means permitting reciprocating movement of said tool holder on said plate, a tool in said tool holder, a reciprocating bar mounted in said frame, a cam roller carried on said bar and operating in a cam slot in said tool holder whereby reciprocating movement in said bar effects reciprocating movement in said tool holder for any adjusted position of said swivel plate on said frame, and means for effecting reciprocation of said bar from the lathe transmission mechanism comprising an eccentric rock shaft, a connecting rod connecting the eccentric portion of said shaft with said reciprocating bar, a dog fixed on said rock shaft, a cam for actuating said dog mounted on a cam shaft, and means for driving said cam shaft from the lathe transmission mechanism.

WILLIAM F. GROENE.